(12) United States Patent
French et al.

(10) Patent No.: US 6,889,502 B1
(45) Date of Patent: May 10, 2005

(54) METHOD OF REDUCING HIGH CYCLE FATIGUE OF TURBOCHARGERS

(75) Inventors: Pierre French, Huddersfield (GB); Arshad Karim, Batley (GB); David Antcliffe, Dalton (GB)

(73) Assignee: Holset Engineering Company, Limited, (GB)

( * ) Notice: Subject to any disclaimer, the term of this patent is extended or adjusted under 35 U.S.C. 154(b) by 0 days.

(21) Appl. No.: 10/726,025

(22) Filed: Dec. 2, 2003

(51) Int. Cl.[7] ............................................. F02D 23/00
(52) U.S. Cl. ..................... 60/601; 123/559.1; 123/564; 701/100
(58) Field of Search .......................... 60/601, 602, 603; 123/559.1, 564; 701/100

(56) References Cited

U.S. PATENT DOCUMENTS

| | | | |
|---|---|---|---|
| 4,044,560 A | 8/1977 | Dorsch et al. | |
| 4,498,443 A | 2/1985 | Hasegawa et al. | |
| 4,603,552 A | 8/1986 | Kido | |
| 4,891,946 A * | 1/1990 | Inoue | 60/602 |
| 5,268,842 A * | 12/1993 | Marston et al. | 701/105 |
| 6,163,254 A | 12/2000 | Smith et al. | |
| 6,415,606 B1 | 7/2002 | Bowman et al. | |
| 6,725,659 B1 * | 4/2004 | Shao et al. | 60/601 |
| 2001/0032466 A1 | 10/2001 | Waszkiewicz et al. | |

FOREIGN PATENT DOCUMENTS

| | | |
|---|---|---|
| EP | 0834984 A2 | 4/1998 |
| EP | 1004760 A2 | 5/2000 |

* cited by examiner

*Primary Examiner*—Sheldon J Richter
(74) *Attorney, Agent, or Firm*—Barnes & Thornburg LLP

(57) ABSTRACT

A method of reducing high cycle fatigue of a turbocharger fitted to an internal combustion engine in which fuel supply to the engine is controlled by an electronic engine management unit (ECU) in accordance with a fuel map of fuel values required to meet different engine operating conditions. The method comprises varying the fuel value F associated with a particular engine operating condition to thereby prevent the turbocharger running at the same constant speed each time said particular engine operating condition arises.

18 Claims, 2 Drawing Sheets

METHOD OF REDUCING HIGH CYCLE FATIGUE OF TURBOCHARGERS

The present invention relates to the reduction of high cycle fatigue of a turbocharger fitted to an internal combustion engine. In particular the invention reduces the high cycle fatigue of the turbocharger turbine wheel blades.

Turbochargers are well known devices for supplying air to the intake of an internal combustion engine at pressures above atmospheric (boost pressures). A conventional turbocharger essentially comprises am exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

Turbine wheel failure through fatigue is often a limiting factor on the durability of a turbocharger. There are various different causes of turbine blade fatigue. One such cause is harmonic vibration of the turbine wheel blades which can occur if the turbine is run at a constant speed, particularly at full load/maximum speed conditions. This is known as high cycle fatigue. To a lesser extent the turbocharger compressor wheel blades may also experience high cycle fatigue. The significance of high cycle fatigue to the lifetime of a turbine wheel will to some extent be dependent on the duty cycle of the engine to which the turbocharger is fitted. High cycle fatigue is particularly relevant to turbochargers used in industrial applications where a turbocharger engine can be run at a constant maximum speed for extended periods of time.

It is an object of the present invention to provide a method of reducing the high cycle fatigue of turbine wheels.

According to the present invention there is provided a method of reducing high cycle fatigue of a turbocharger fitted to an internal combustion engine in which fuel supply to the engine is controlled by an electronic engine management unit (ECU) in accordance with a fuel map of fuel values required to meet different engine operating conditions, the method comprising:

varying the fuel value F associated with a particular engine operating condition to thereby prevent the turbocharger running at the same constant speed each time said particular engine operating condition arises.

For instance the fuel supply may be varied by modifying a fuel value F determined from the engine map as appropriate to meet a particular engine operating condition, by the application of a varying perturbation signal to the fuel value F. Only a relatively small change to the fuel supply is necessary to vary the turbocharger speed sufficiently to avoid high cycle fatigue being concentrated on any particular turbine (or indeed compressor) blade.

The present invention also provides a fuel supply control system for a turbocharged internal combustion engine, the control system comprising means for varying the fuel value supplied to meet a particular engine operating condition to thereby prevent the engine and turbocharger from running at the same constant speed each time said particular engine operating condition arises.

Further advantageous features of the present invention will become apparent from the following description.

Embodiments of the present invention will now be described by way of example only, with reference to the accompanying drawings, in which.

The operation of modern internal combustion engines is typically controlled by an electronic engine management unit, often referred to as the ECU (electronic control unit). The ECU receives data from various sensors relating to all aspects of engine performance, and operational demands, and controls operation of the engine accordingly. If the engine is fitted with a turbocharger the ECU may additionally receive signals indicative of the operating conditions of the turbocharger and may also apply some direct control over operation of the turbocharger.

Figure 1:
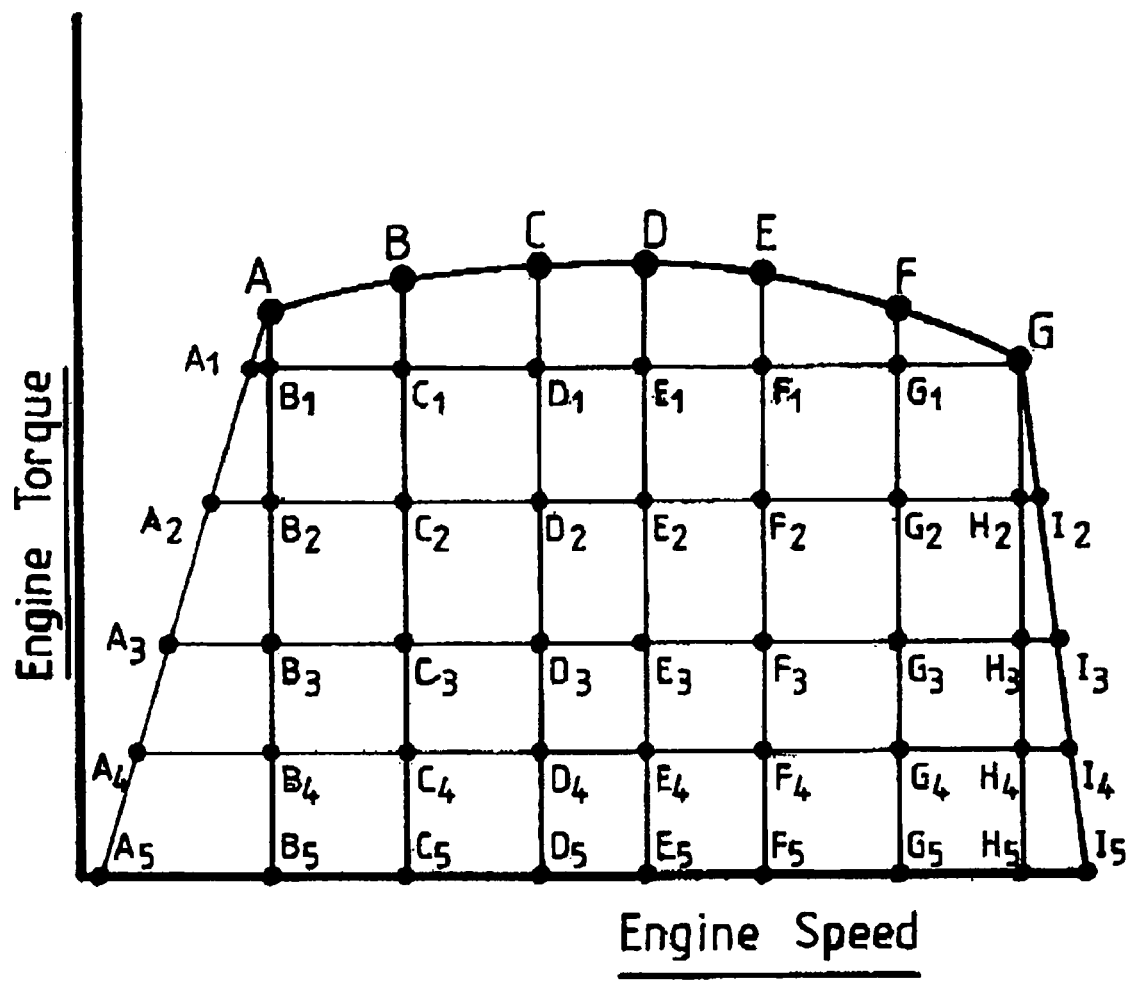
FIG. 1 illustrates an example of an internal combustion engine fuel map.

The conventional ECU includes a processor which governs engine performance on the basis of a series of data "look-up tables" or "maps" of empirically derived datapoints from which particular operating requirements can be determined from various measured parameters. One such map is the fuel map, an example of which is illustrated in FIG. 1. The fuel map relates fuel requirement (or consumption) to the engine speed and torque demand. Various different fuel values are mapped for different engine specd/torque demand conditions as indicated by the values $A_x$, $B_x$, $C_x$ ... etc. For engine speed/engine torque requirements not expressly mapped, appropriate fuelling values can be derived by interpolation from the mapped values.

Such electronic control of the engine fuelling provides very precise control over the engine speed, and thus turbocharger turbine speed. The present invention recognises that such precise control exacerbates the problem of high cycle fatigue. That is, if engine operating conditions require constant speed the engine ECU will operate to provide that constant speed with a very high degree of accuracy. Similarly, if the duty cycle of the engine requires the engine to be frequently run at a particular target speed, for instance maximum speed and load, the ECU will operate to ensure that the target speed reached is the same on each occasion.

The basic principle of the present invention is to introduce a perturbation into the operation of a turbocharged engine to deliberately vary the running speed of the turbocharger, (at least under running conditions expected to give rise to significant high cycle fatigue), in such a way as to reduce the effect of high cycle fatigue on individual blades. The invention achieves this through perturbation of the engine fuelling.

Figure 2:
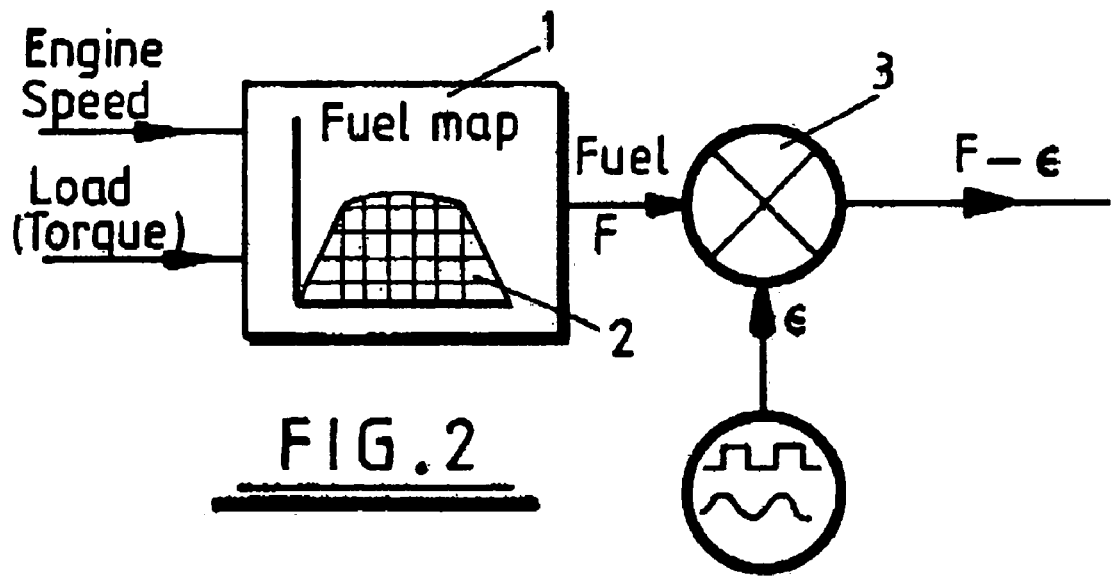
FIG. 2 is a schematic illustration of a control system for reducing high cycle fatigue in accordance with the present invention.

A first embodiment of the present invention is schematically illustrated by FIG. 2. Signals indicative of the engine speed and load (torque) requirements are input to the engine ECU 1. From an engine fuel map 2 pre-programmed into the ECU, the ECU determines the required fuelling F to meet the operating requirement and sends an appropriate fuelling signal to fuel supply system 3. In accordance with the invention a time varying perturbation signal E is provided to the fuel supply system 3 to vary the fuelling so that the fuel supply to the engine is F-E (here B may be a positive or negative value and may change from positive to negative). The perturbation signal may be a randomly varying signal or maybe a regular periodic signal such as a sinusoidal or square wave signal or the like. A frequency of between about 0.1 seconds and 10 seconds would typically be appropriate.

The pertubation signal E therefore prevents the engine from running at a constant speed for any significant period of time. The resonant frequency of any individual turbocharger turbine blade will have a high Q value, so that only a slight deviation in rotational speed (equivalent to of the order of several Hertz) is required to move away from the resonate frequency of any particular blade. Accordingly, only very small changes in the engine speed, and thus turbocharger speed, are necessary to ensure that any particular blade does not significantly resonate. It should be borne in mind that different blades will have different resonate frequencies and thus at any given time there may be one or more blades resonating, but the vibration and thus fatigue, of any particular blade will be greatly reduced.

It is highly desirable to ensure that the perturbation does not compromise engine performance. In practice, a perturbation of not more than 3% of the normal specified fuelling F will not perceptibly interfere with engine performance but will provide sufficient variation in the turobcharger speed to greatly reduce the high cycle fatigue, given the high Q value of the resonant frequency of individual turbine blades.

Whereas in the illustration of FIG. 2, and as described above, the perturbation signal is provide to the fuel system, it will be appreciated that the ECU may be programmed to introduce the necessary perturbation into the fuelling value supplied to the fuel system. Similarly, it will be appreciated that a separate fuel control device could be introduced in the fuel line to the engine to vary the engine fuelling in accordance with the perturbation signal (such as a variable restriction in the fuel line).

Figure 3:
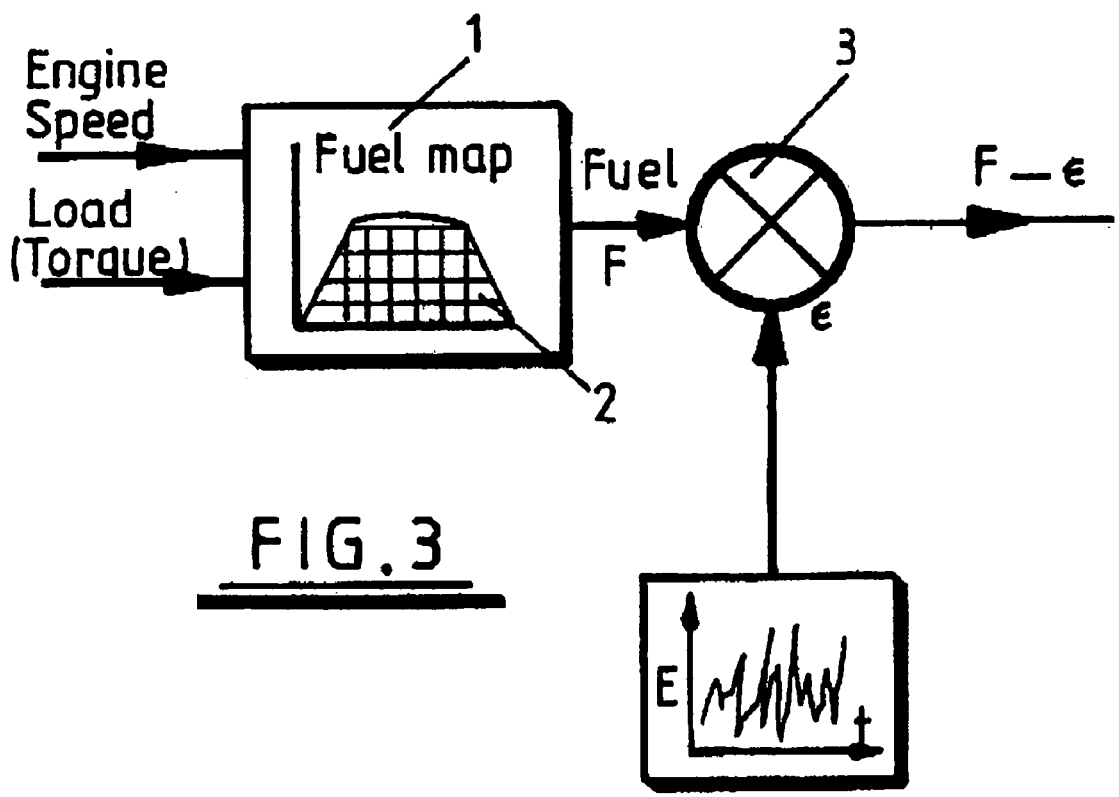
FIG. 3 is a schematic illustration of an alternative control system for reducing high cycle fatigue in accordance with the present invention.

An alternative approach to perturbing the fuel supply is schematically illustrated in FIG. 3. Here, rather than continuously varying the fuelling value F, a random perturbation E (within predetermined limits) is introduced to the target fuelling value F determined by the engine map as appropriate for any particular engine operating condition. Thus, each time the same engine operating condition, is encountered the engine will run at a slightly different speed/load point as a result of the perturbation. Although in any given cycle the engine turbocharge speed will be constant if there is no change to operating requirements, the variation in turbocharger speed between different cycles will be sufficient to greatly reduce the high cycle fatigue in the turbine blades.

It will be appreciated that as with the first described embodiment of the invention, the perturbation need not be introduced directly to the fuel supply system, but could be incorporated into the ECU programming. For instance, the fuelling values determined firm the engine fuel map may be adjusted by the perturbation E each time that fuel value is called upon. There will also be appreciated that the perturbation E need not be random but could follow a pre-programmed cycle.

It will further be appreciated that the above two embodiments of the invention could be combined in a single application. That is, the target fuel value F could be varied by a first perturbation $E_1$ each time that fuelling value is called from the fuel map to produce a modified fuel value $F_m$. The fuel value $F_m$ may then be further modified by application of a varying perturbation signal $E_2$ in accordance with the first described embodiment of the invention so that the actual fuel value supplied to the engine is $F_m - E_2$ (where E is again a value which may be a positive or negative, or a value which varies between positive and negative).

As a further modification of the present invention, the perturbation need not necessarily be applied under all engine operating conditions, but may be limited to conditions under which high cycle fatigue is anticipated to be a particular problem. For instance, it is possible to identify regions of the fuel map which may correspond with constant speed/constant load running or other operating conditions under which turbine blade resonance may be expected to occur. The ECU or other dedicated controller could then be programmed to implement the invention only in such regions of the fuel map.

Other possible modifications of the invention will be readily apparent to the appropriately skilled person.

What is claimed is:

1. A method of reducing high cycle fatigue of a turbocharger fitted to an internal combustion engine in which fuel supply to the engine is controlled by an electronic engine management unit (ECU) in accordance with a fuel map of fuel values required to meet different engine operating conditions, the method comprising:
   varying the fuel value F associated with a particular engine operating condition to thereby prevent the turbocharger running at the same constant speed each time said particular engine operating condition arises.

2. A method according to claim 1, wherein the fuel supply is varied by modifying a fuel value F determined by the engine map to meet said particular engine operating condition by applying a varying perturbation E to the fuel value F.

3. A method according to claim 2, wherein each time said particular engine operating condition arises the specified fuel value F is perturbed and then remains constant for the duration of that instance of said engine operating condition, but wherein the perturbation value varies between different instances at which said particular engine operating condition arises.

4. A method according to claim 2, wherein said perturbation value is randomly selected from a first range of values.

5. A method according to claim 4, wherein said perturbation value is sequentially selected from a range of possible perturbation values.

6. A method according to claim 4, wherein said first range of values is determined as a proportion of the specified fuel value F.

7. A method according to claim 6, wherein said proportion is not greater than 3% of the fuel value.

8. A method according to claim 2, wherein said perturbation value varies over time throughout the duration of said particular engine operating condition, so that whilst that said particular engine operation condition the engine and turbocharger running speed varies over time.

9. A method according to claim 8, wherein said time varying perturbation is a regular periodic perturbation to the fuel value.

10. A method according to claim 8, wherein said perturbation value varies across a first range of values.

11. A method according to claim 10, wherein said first range of values is determined as a percentage of the specified fuel value F.

12. A method according to claim 11, wherein said percentage is +/−3% of the specified fuelling value.

13. A method according to claim 2, wherein the specified fuel value F is supplied to the fuel supply control system and a separate perturbation signal is also applied to a fuel supply control system to modify the fuel value F.

14. A method according to claim 2, wherein the specified fuel value determined from the engine map is modified by application of said perturbation by the ECU prior to supplying a fuel supply signal to the engine fuel supply system.

15. A method according to claim 2, wherein the fuel supply value is varied for each one of a range of engine operating conditions.

16. A method according to claim 15, wherein said range of engine operating conditions is the full range of engine operating conditions encountered by the engine.

17. A method according to claim 15, wherein said range of engine operating conditions are selected operating conditions which are determined as likely to give rise to high cycle fatigue.

18. A fuel supply control system for a turbocharged internal combustion engine, the control system comprising means for varying the fuel value supplied to meet a particular engine operating condition to thereby prevent the turbocharger from running at the same constant speed each time said particular engine operating condition arises.

* * * * *